Figure 1:
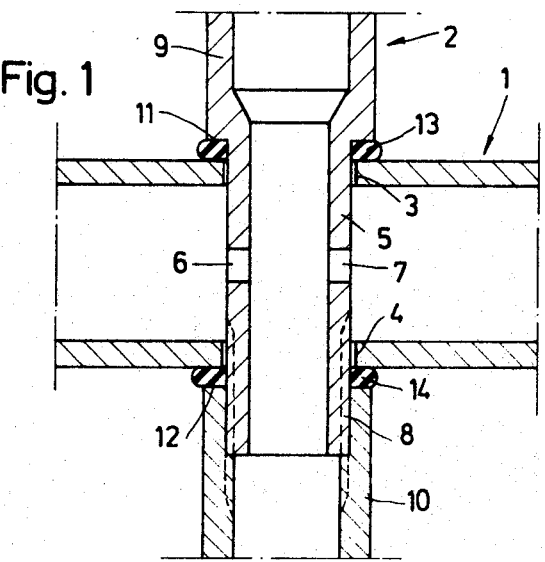

United States Patent [19]
Andersson

[11] 3,724,810
[45] Apr. 3, 1973

[54] VALVED PIPE LINE CONNECTION
[76] Inventor: Rune Siqvard Andersson, Ossjo 43, Angelholm, Sweden
[22] Filed: Jan. 14, 1971
[21] Appl. No.: 106,322

[30] Foreign Application Priority Data
Feb. 18, 1970    Sweden ..............................2052/70

[52] U.S. Cl.................................251/145, 251/146
[51] Int. Cl............................F16k 51/00, F16l 41/00
[58] Field of Search.............................251/145, 146

[56] References Cited
UNITED STATES PATENTS
2,439,539    4/1948    Cellwork.............................251/146
2,696,361    12/1954    Jensen............................251/145 X Primary Examiner—Henry T. Klinksiek
Attorney—John J. Dennemeyer

[57] ABSTRACT

A method for obtaining a connection between a feed pipe line and a branch pipe line, wherein an opening is made in the envelope surfaces of each line whereupon the branch pipe line, which has been provided with at least one annular sealing element is introduced through the openings of the feed pipe line until the opening in the branch pipe line is situated within the feed pipe line and until the sealing element for sealing the opening in the envelope surface of the feed pipe line under pressure contacts said envelope surface, so that the branch pipe line is permanently fixed.

7 Claims, 4 Drawing Figures

VALVED PIPE LINE CONNECTION

This invention refers to a method for obtaining a pipe line connection and a device manufactured in accordance with this method.

In known methods a branch pipe line is connected to a feed pipe line by cutting the latter and providing it with end threads on which T- or angular connection pieces are screwed, whereupon the branch pipe line is coupled by screwing. This known method brings with it time-consuming assembly work. Especially designed pipe connections are also required and the connection requires sealings at three points or more. Particularly when already installed pipe lines are to be provided with branch pipe lines of any kind, troubles arise in making the connection. Thus the installed tube has to be cut, which, however, owing to the localization of the pipe line, often may not be realized without changing the localization of the pipe line, which further increases the assembly time and consequently also the stoppage. These disadvantages have been eliminated by this new invention and the method according to the invention is mainly characterized in that an opening is made in the envelope surfaces in each line, whereupon the branch pipe line, which has been provided with at least one annular sealing element is introduced through the opening of the feed pipe line until its opening is situated within the feed pipe line and until the sealing element, while sealing the opening in the envelope surface of the feed pipe line under pressure, contacts said envelope surface, in which position the branch pipe line is permanently fixed. This means that the feed pipe line may be provided with branch pipe lines in a considerably shorter time than before and that a reduced number of joint points is obtained.

The method and the device for bringing the same into practice appears from the following description taken in connection with the accompanying drawings, which show some embodiments of the invention.

FIG. 1. shows the pipe line connection according to the invention in a horizontal section.

Figure 2:
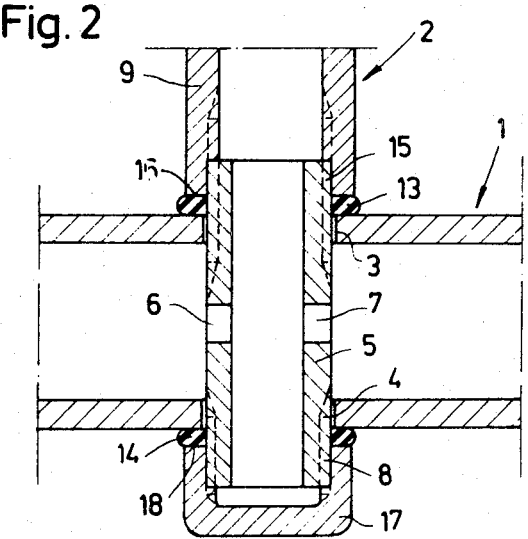

FIG. 2. shows an alternative embodiment of the pipe line connection in a horizontal section.

Figure 3:
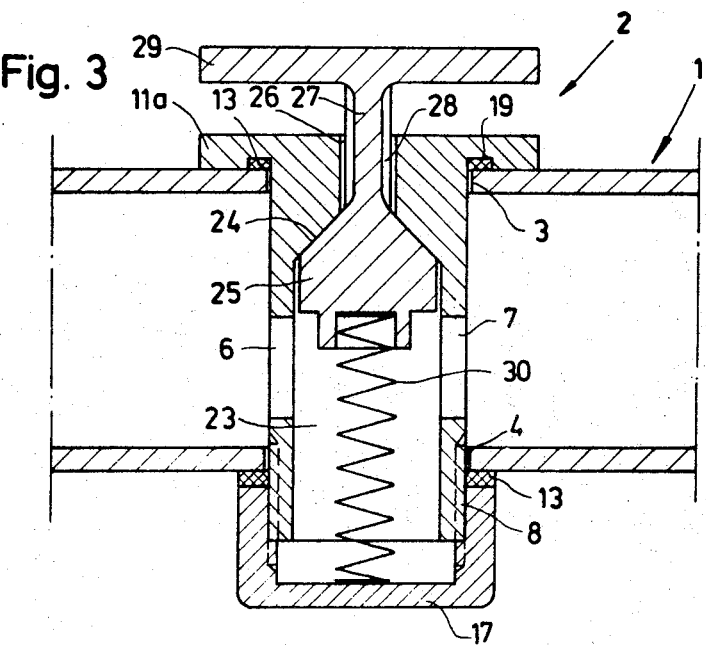

FIG. 3. shows a third embodiment of the pipe line connection in a horizontal section.

Figure 4:
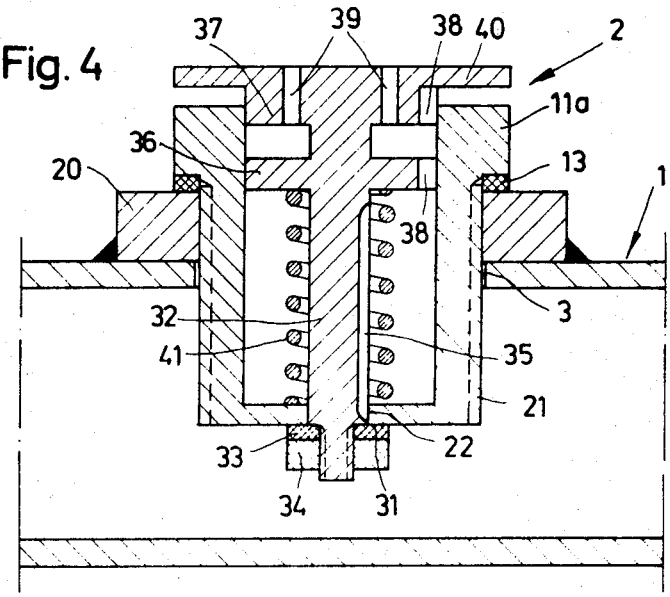

FIG. 4. shows a fourth embodiment of a pipe line connection in a horizontal section.

In the drawings the numeral 1 generally designates a cylindrical feed pipe line and the numeral 2 designates a cylindrical branch pipe line. The envelope surface of the feed pipe line is provided with two radially extending mutually co-axial borings 3 and 4 through which is introduced an inlet part 5 of the branch pipe line 2. In said inlet part are two radially extending inlet openings 6 and 7, which are co-axial relative to each other, and which, in the operative position of the branch pipe line 2, are preferably in a co-axial position relative to the center of the feed pipe line. The inlet part 5 has a smaller sectional area than the remaining parts 9, 1o of the feed pipe line.

In the embodiment shown in FIG. 1 said inlet part 5 constitutes a stationary part of the branch pipe line 2. The free outer end of the inlet part is provided with an externally threaded portion 8 and the branch pipe line 2 has a radially extending edge serving as an abutment element, which mutually connects the outer envelope surfaces of part 5 and part 9 and is designated 11. On the threaded portion 8 of the branch pipe line is screwed another branch pipe line part 10 having internal threads, and whose end edge, which is intended to serve as an abutment, is designated 12. Between the end edges 11, 12 of the branch pipe line parts 9, 1o and the envelope surface of the feed pipe line sealing rings 13 and 14 of elastic material are inserted, for example of rubber or leather, which surround the inlet part peripherally.

In the embodiment shown in FIG. 2 the inlet part 5 consists of a separate tube piece whose end portion 15, which is opposite to the end portion 8, is likewise provided with threads on which the branch pipe line part 9 is screwed. The end edge of the pipe line part 9, which is intended to serve as an abutment element, is designated 16. On the other end 8 of the inlet part 5 an internally threaded sleeve 17 is screwed, which is closed at one end and whose end edge, which is intended to act as an abutment means, is designated 18.

FIG. 3 shows a third embodiment, which is similar to the embodiment of FIG. 2 but in which the whole branch line 2 consists of an inlet part 5. The end portion of said inlet part 5, which is opposite to the sleeve 17, is formed as an abutment means in the shape of an annular, radially extending flange 11a. In the side of this flange, which faces the feed pipe line 1, is provided a groove 19, which surrounds the envelope surface of the inlet part 5. The sealing ring 13 is inserted in said groove.

In the embodiment shown in FIG. 4 there is only provided one opening 3 in the envelope surface in the feed pipe line 1 and through this opening the branch pipe line 2, which also in this case consists only of an inlet part 5, penetrates into the flow channel of the pipe line 1. On the outer envelope surface of the pipe line 1 is welded a nut 20, which is concentric with the opening 3 and the envelope surface of the pipe line 2 is provided with external threads 21 for co-operation with the nut. The outer end portion of the pipe line 2 is provided with a radially extending abutment serving means 11a, between which and the nut the sealing ring 13 is arranged. An inlet opening 22 is provide co-axially with the longitudinal axis of the pipe line 2.

As shown in FIG. 3 a valve may be incorporated in the branch pipe line 2, whereby the pipe line itself constitutes the valve body, the flow channel 23 of which is provided with a wall 24, which is conical and diminishes towards the outlet and which constitutes the valve seat. In the channel 23 is inserted an axially displaceable valve body 25, which has the same conical shape as the wall portion 24 and is adapted to sealingly contact the latter and which is provided with a shaft 27, which is introduced in the outlet channel 26 of the valve body. Said shaft 27 has axially extending grooves 28, which allow flowing. The shaft 27, the length of which is such that it ends a certain distance from the end of the valve body, is in its end provided with a pressure plate 29. Between the inner end of the valve body 25 and the sleeve 17 a spirally wound return spring 30 may be adapted.

Also the branch pipe line according to FIG. 4 is well suited for incorporating a valve. In this case the valve seat consists of the portion of the end surface of the pipe line 31, which surrounds the inlet opening 22 and the valve body consists of a sealing ring 33, which is arranged over the shaft and secured by means of a nut 34. The shaft 32 is provided with an inlet flow groove 35 and with guide flanges 36 and 37, which are provided with flow channels 38 and 39, whereby the latter flange 37 also constitutes a pressure plate 40. A spirally wound return spring, which is arranged on the shaft 32 and also abuts against the flange 36 and the end wall of the valve body, is designated 41.

MANUFACTURE OF THE DEVICE

In the envelope surface of the feed pipe line 1 the two mutually co-axial openings 3, 4 are first made, whereupon the sealing ring 13 is applied on the inlet part 5, which has been provided with the opening 22 or the openings 6, 7 and is pressed against the edge portion 11 or inserted in the groove 19 in the embodiment shown in FIG. 2. The inlet part 5 is then inserted in the feed pipe line 1 by screwing in the embodiment according to FIG. 4 until the sealing ring in the latter embodiment under pressure contacts the envelope surface of the feed pipe line. In the embodiments according to FIGS. 1–3 the sealing ring 14 is then applied on the free end portion of the inlet part 5 whereupon the tube part 1o respectively the sleeve 17 are screwed until the latter sealing ring 14 under pressure contacts the envelope surface of the feed pipe line. Also the sealing ring 13 contacts the envelope surface of the feed pipe line 1 in these embodiments.

Further embodiments are possible within the scope of the appended claims. The active surfaces of the abutment elements may have the shape of a part of a circle, the radii of which correspond to the outer envelope radius of the feed pipe line. Additionally, the opening of the branch pipe line 2 may be funnel shaped and the valve body 27 may be provided with a conical end portion 29, which may be introduced in the opening, and the branch pipe line 2 may be arranged to slope downwardly and its inlet openings 6, 7 may be situated as far as possible from the bottom of the feed pipe line 1, which in a high degree prevents impurities accumulated on said bottom from entering into the branch pipe line 2.

What is claimed is:

1. A device for connecting a valve to a feed pipe line comprising:
   a. an inlet member extending transversely entirely through the feed pipe line,
   b. an inlet opening in said inlet member for receiving fluid from the feed pipe line,
   c. an external member attached to one end of said inlet member, said external member including a first abutment means,
   d. a first sealing means between said first abutment means and an exterior surface of the feed pipe line,
   e. said inlet member having an external portion at the other end thereof, said external portion having a second abutment means thereon,
   f. a second sealing means between said second abutment means and an exterior surface of the feed pipe line,
   g. a discharge passage and associated discharge opening in said inlet member, said discharge passage communicating with said inlet opening,
   h. a valve means in said inlet member between said inlet opening and said discharge passage, said valve means controlling flow from said inlet opening to said discharge opening,
   i. a shaft connected with said valve means, said shaft being disposed longitudinally within said discharge passage,
   j. said shaft having a portion extending from said discharge passage to the exterior of said inlet member, said extending portion having an operator member thereon, both said operator member and said discharge opening being disposed on the same side of said inlet member.

2. A device as defined in claim 1, wherein said inlet opening comprises a pair of spaced, co-axial ports, the axis of said ports being parallel to the axis of the feed pipe line.

3. A device as defined in claim 1, wherein said valve means includes a conical valve seat and corresponding conical valve member, said valve member being axially displaceable in said inlet member.

4. A pipe line valve connection comprising:
   a. a feed pipe line having a lateral opening therein,
   b. a nut fixedly mounted on an exterior surface of said feed pipe line in concentric relationship with said lateral opening,
   c. an inlet member disposed in said lateral opening and threadably engaging said nut, said inlet member having a first portion extending to the exterior of said feed pipe line, and a second portion extending into the interior of said feed pipe line,
   d. an abutment means on said first portion of said inlet member,
   e. a sealing means between said abutment means and said nut,
   f. an inlet opening in said second portion of said inlet member,
   g. a valve means in said inlet member for controlling flow from said feed pipe line through said inlet member.

5. A pipe line valve connection as defined in claim 4,
   a. wherein said valve means includes a moveable member,
   b. said moveable member having a valve operator associated therewith,
   c. said valve means having a discharge opening associated therewith,
   d. said moveable member and said discharge opening being on the same side of said feed pipe line.

6. A pipe line valve connection as defined in claim 5,
   a. wherein said moveable member has an inlet flow groove therein
   b. said moveable member having a guide flange cooperating with said inlet member,
   c. a flow channel in said guide flange, said flow channel communicating with said discharge opening,
   d. said inlet flow groove and said flow channel effecting communication between the interior of said feed pipe line and said discharge opening.

7. A pipe line valve connection as defined in claim 5
   a. wherein said inlet member includes an inlet opening,
   b. said moveable member having a sealing element therein,
   c. said sealing element being engagable with said inlet member in an area surrounding said inlet opening to control flow between the interior of said feed pipe line and said discharge opening.

* * * * *